(12) United States Patent
Johnson

(10) Patent No.: US 8,847,105 B2
(45) Date of Patent: *Sep. 30, 2014

(54) ROTATING LASER WELDING PRESSURE UNIT

(71) Applicant: Benecor, Inc., Wichita, KS (US)

(72) Inventor: Jeffrey Don Johnson, Wichita, KS (US)

(73) Assignee: Benecor, Inc., Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,674

(22) Filed: Oct. 24, 2012

(65) Prior Publication Data
US 2013/0048615 A1    Feb. 28, 2013

Related U.S. Application Data

(63) Continuation of application No. 12/766,516, filed on Apr. 23, 2010, now Pat. No. 8,299,392.

(51) Int. Cl.
*B23K 26/08* (2014.01)
*B23K 26/28* (2014.01)

(52) U.S. Cl.
USPC .................................. 219/121.6; 219/121.63

(58) Field of Classification Search
USPC ........................................ 219/121.6, 121.63
See application file for complete search history.

(56) References Cited

U.S. PATENT DOCUMENTS

| 6,793,118 B2 | 9/2004 | Palm | |
|---|---|---|---|
| 7,009,141 B1* | 3/2006 | Wool et al. | 219/121.73 |
| 7,619,180 B2* | 11/2009 | Diem | 219/121.63 |
| 8,299,392 B2* | 10/2012 | Johnson | 219/121.6 |

FOREIGN PATENT DOCUMENTS

| JP | 2007118015 | 5/2007 |
|---|---|---|
| KR | 1020030052579 | 6/2003 |

* cited by examiner

*Primary Examiner* — Evan Pert
(74) *Attorney, Agent, or Firm* — Spencer Fane Britt & Browne LLP

(57) ABSTRACT

A laser welding pressure unit comprises a housing, a rotating element, and a foot. The housing may attach to a laser head. The rotating element may include an outer ring rotatably coupled to an inner ring, wherein the outer ring is coupled to the housing. The foot may couple to the inner ring such that the foot rotates with respect to the housing. The foot may also be configured to contact an upper surface of a metal sheet and may be oriented such that while the metal sheet is being welded, the foot rotates about a central vertical axis and the laser welding pressure unit is able to move in any direction without the foot breaking contact with the surface.

20 Claims, 5 Drawing Sheets

ROTATING LASER WELDING PRESSURE UNIT

CROSS-REFERENCE TO RELATED APPLICATIONS

The present non-provisional patent application is a continuation patent application of application Ser. No. 12/766,516, filed Apr. 23, 2010, titled ROTATING LASER WELDING PRESSURE UNIT, the contents of which are hereby incorporated by reference into the present continuation application.

BACKGROUND OF THE INVENTION

1. Field of the Invention

Embodiments of the present invention relate to laser welding. More particularly, embodiments of the present invention relate to a pressure unit to be used with a laser welding system that includes a rotating foot.

2. Description of the Related Art

A laser welding system may be used in a variety of applications, such as machine or automotive assembly, where the laser welding system may be used to weld workpiece materials, primarily metals, that are of different thicknesses or compositions or that require a small weld zone. The workpieces to be welded may abut one another and the weld may occur at the interface where the two pieces are joined. The laser welding system may also be used in joining workpieces that are superimposed, one on top of another. Typically, these workpieces are thin sheets of metal foil, which are layered one on another to form a structure.

The laser welding system may include a pressure foot to apply pressure to the top surface of the superimposed workpieces while the workpieces are welded together. The pressure foot must maintain contact with the workpieces while the laser head is in motion to make the weldments. Thus, the pressure foot must be able to move across the surface of the workpieces smoothly and still apply even pressure to the workpieces. Conventional pressure feet may be elongated and unable to apply pressure evenly to the work surface along the length of the weld pattern. Other pressure feet may include rollers or wheels that apply pressure to the surface while rolling. The wheels may include a variance in wheel height, wheel edge contour, or wheel alignment that can result in poor weld interface contact and reduced weld quality and strength. Furthermore, pressure feet that include wheels generally only support motion along one axis of movement.

SUMMARY OF THE INVENTION

Embodiments of the present invention solve the above-mentioned problems and provide a distinct advance in the art of laser welding. More particularly, embodiments of the invention provide a laser welding pressure foot that can apply pressure evenly along the length of a weld along more than one axis of movement.

Various embodiments of the present invention include a laser welding pressure unit comprising a housing, a rotating element, and a foot. The housing may attach to a laser head. The rotating element may include an outer ring rotatably coupled to an inner ring, wherein the outer ring is coupled to the housing. The foot may couple to the inner ring such that the foot rotates with respect to the housing. The foot may also be configured to contact an upper surface of a metal sheet and may be oriented such that while the metal sheet is being welded, the foot rotates about a central vertical axis and the laser welding pressure unit is able to move in any direction without the foot breaking contact with the surface.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention is described in detail below with reference to the attached drawing figures, wherein.

Figure 1:
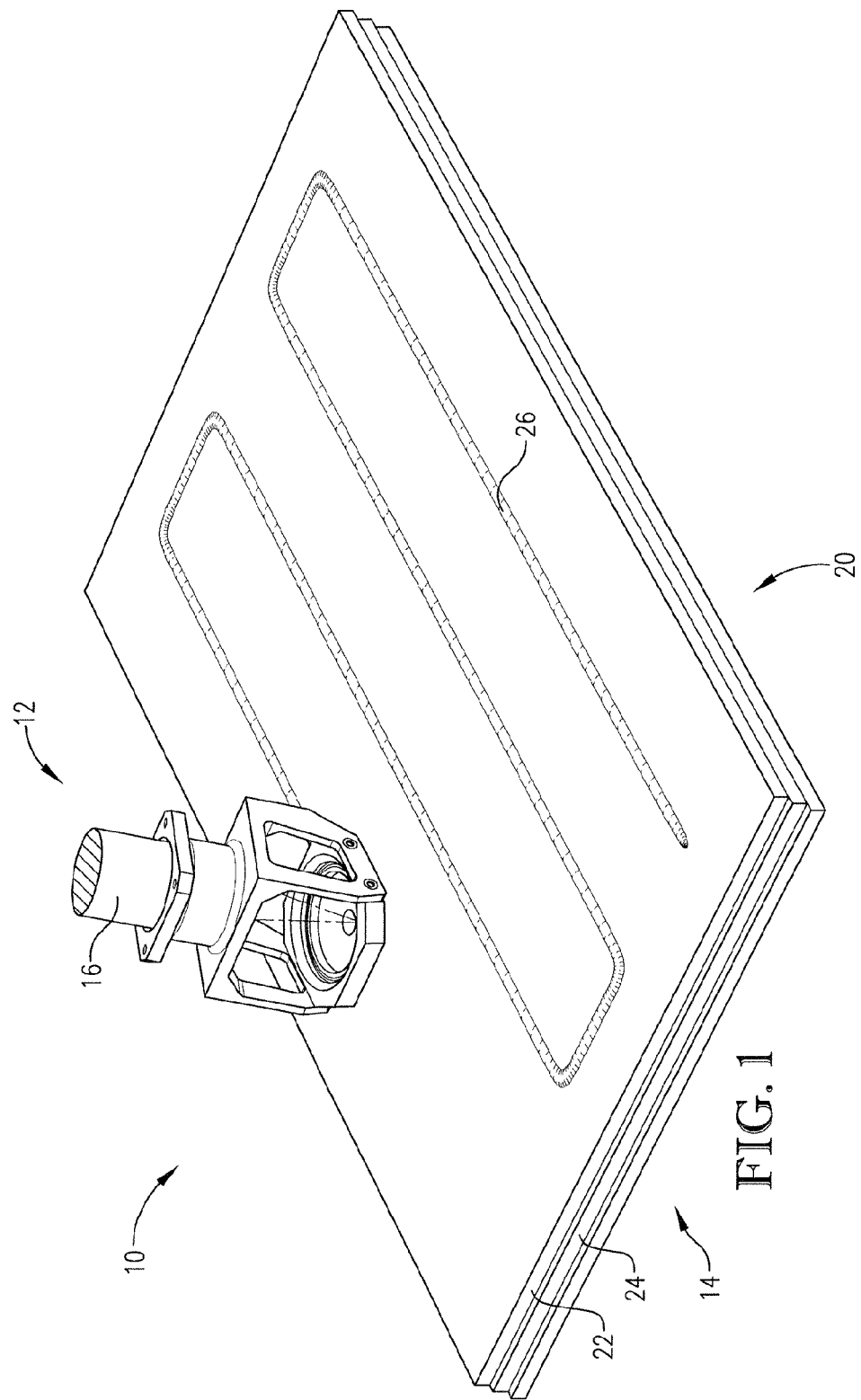
FIG. 1 is an overhead perspective view of a laser welding system that utilizes a laser welding pressure unit constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
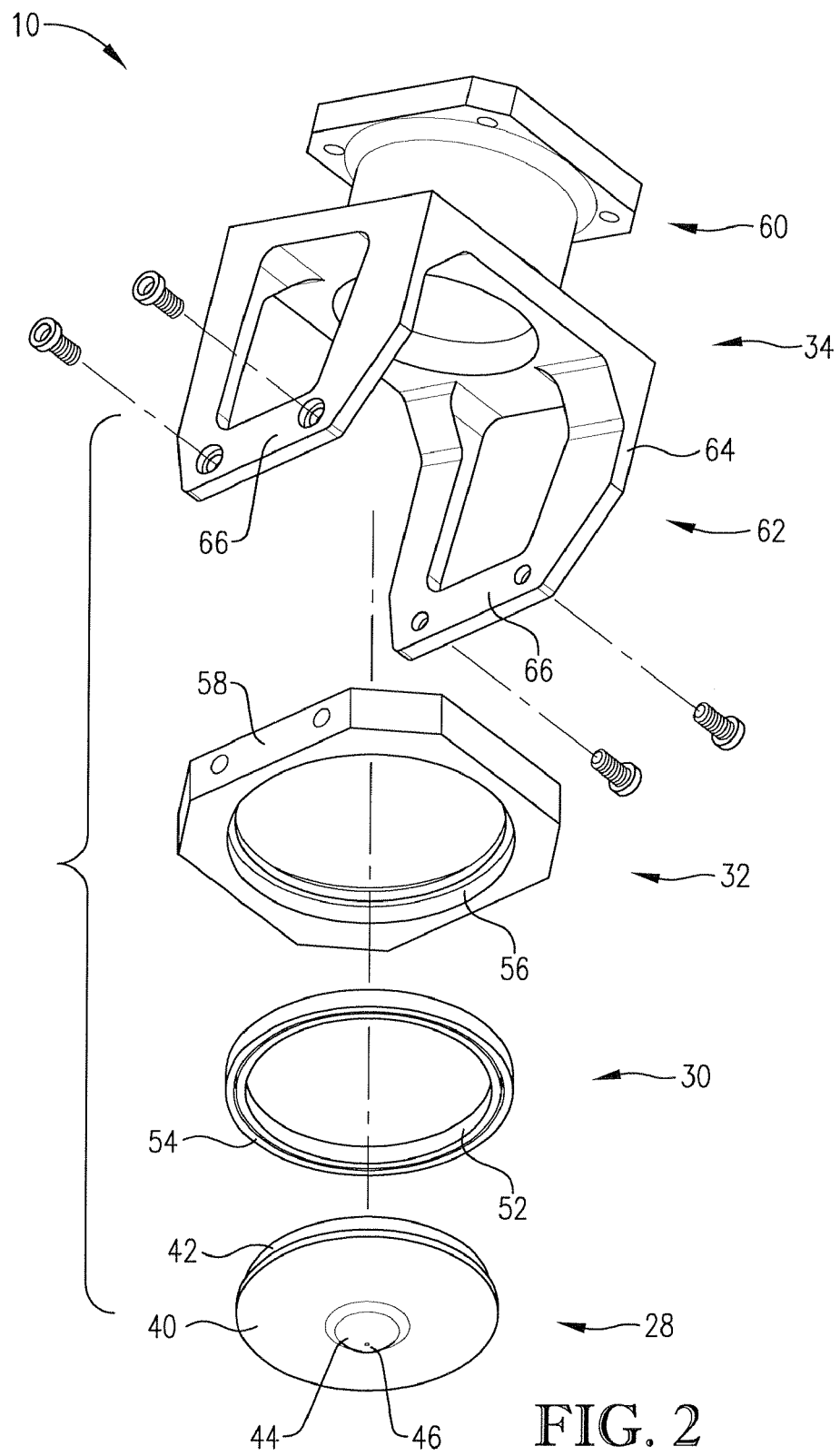
FIG. 2 is an exploded view of the laser welding pressure unit.
Figure 3:
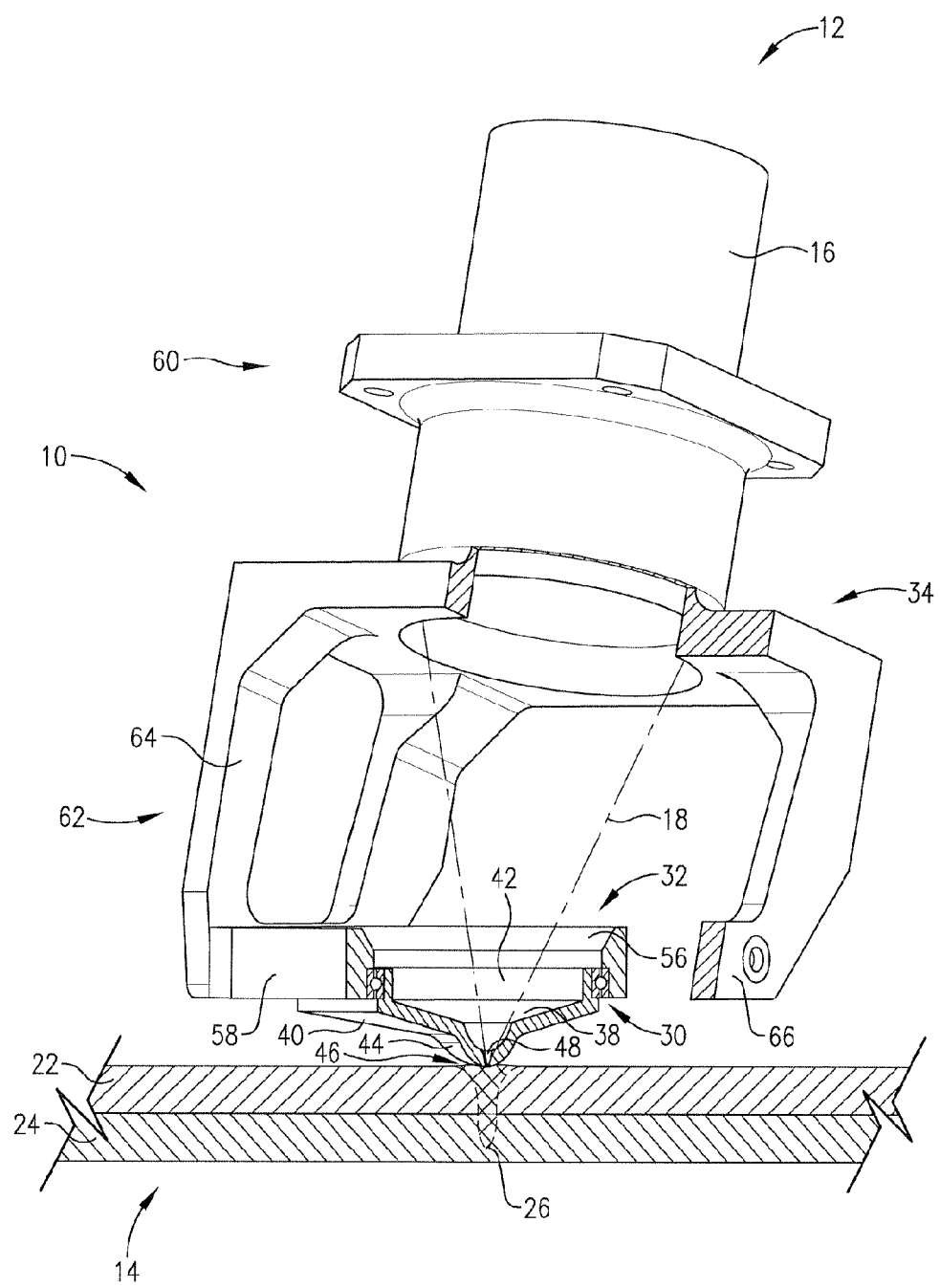
FIG. 3 is a side view of the laser welding pressure unit showing partial sections of a housing, a retaining element, a rotating element, and a foot.

A laser welding pressure unit 10 constructed in accordance with various embodiments of the present invention is shown in FIGS. 1-5. Particularly with reference to FIG. 1, the pressure unit 10 may be used with a laser welding system 12 in laser welding a plurality of workpieces or sheets 14. The laser welding system 12 may include a laser head 16 which generates a laser beam 18. The sheets 14 may be of very thin metal that can be superimposed, one on top of another, to form a stack 20 with an upper layer 22 and a lower layer 24. Typically, the pressure unit 10 moves along the top surface of the upper layer 22 to apply pressure while the two sheets 14 (the upper layer 22 and the lower layer 24) are welded together by the laser welding system 12. The laser welding pressure unit 10 allows the laser welding system 12 to create a weld 26 in a serpentine pattern or other continuous nonlinear or orthogonal type of pattern, as described in more detail below, without pausing the laser welding system 12 or reconfiguring the pressure unit 10. Generally, the laser welding system 12 may create a weld 26 in nearly any pattern because the laser welding pressure unit 10 can easily change direction while welding without breaking contact with the surface of the sheet 14. As seen in FIG. 2, the pressure unit 10 may broadly comprise a foot 28, a rotating element 30, a retaining element 32, and a housing 34.

Figure 4:
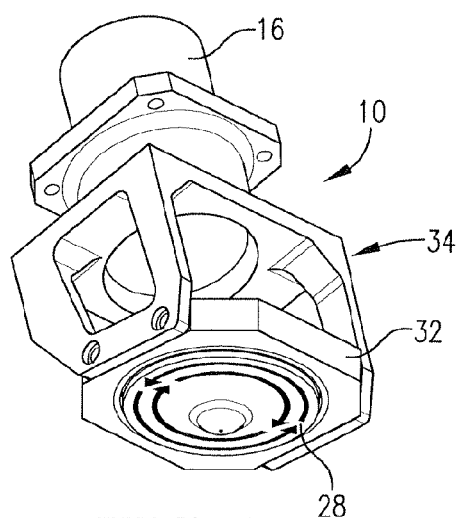
FIG. 4 is a perspective view from beneath the laser welding pressure unit depicting rotation of the foot.
Figure 5:
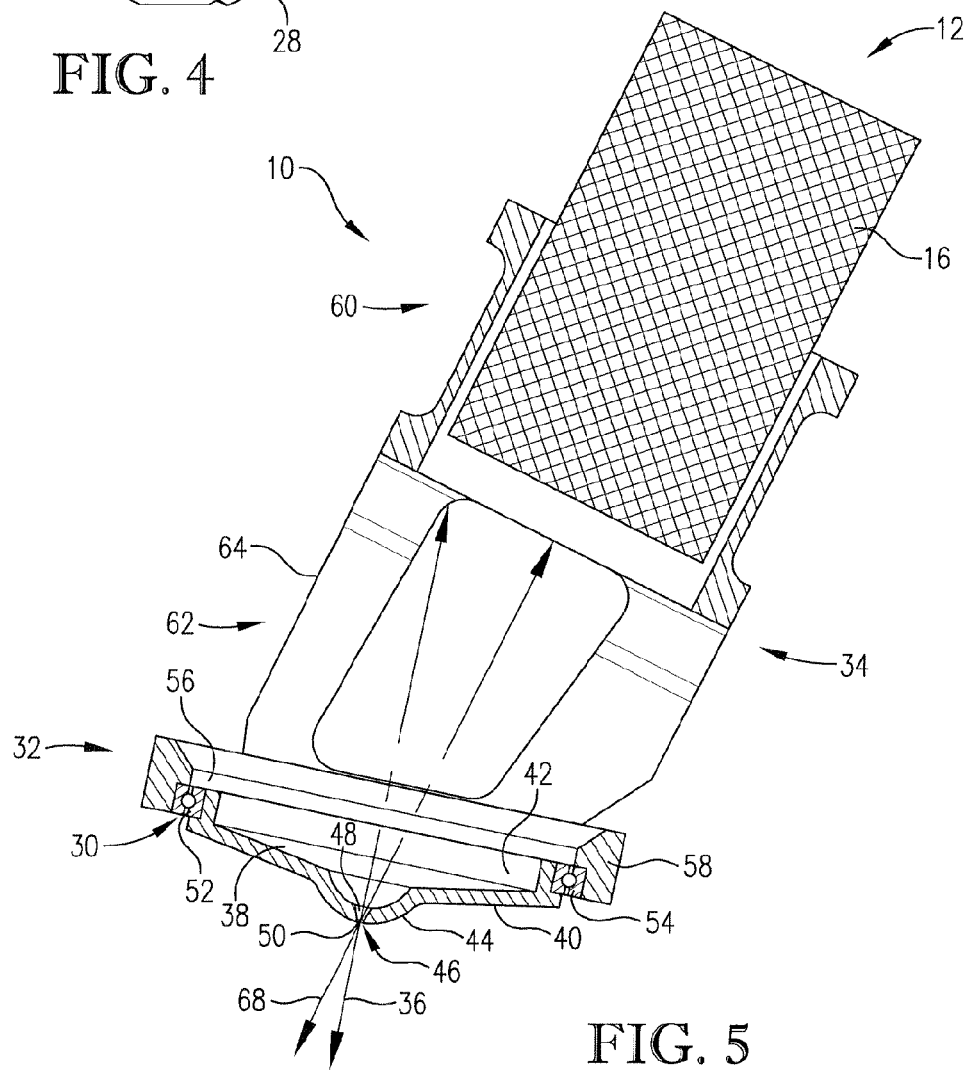
FIG. 5 is a sectional view of the laser welding pressure unit cut along a central vertical plane.

The foot 28 generally makes contact with the upper layer 22 in order to apply pressure during the welding process. The foot 28 may be manufactured from any number of materials that possess great strength and tolerance to high temperatures, such as hardened steel, ceramic, or the like. The foot 28 may rotate about a central vertical axis 36, as seen in FIGS. 4-5 and discussed below, while the pressure unit 10 moves along the upper layer 22. The foot 28 may have a general disc shape with a circular outer edge, and may include an upper surface 38 that faces the laser welding system 12 and a lower surface 40 that faces the sheets 14. The foot 28 may have a general downward slope, of both the upper surface 38 and the lower surface 40, towards its center, such that the foot 28 generally protrudes towards the sheets 14. The foot 28 may also include a coupling element 42, a contact region 44, and an aperture 46.

The coupling element 42 generally connects the foot 28 with the rotating element 30. The coupling element 42 may be ring-shaped and positioned on the upper surface 38 near the outer edge of the foot 28 such that it generally extends away from the upper surface 38. In various embodiments, the coupling element 42 may be integrally formed with the foot 28.

The contact region 44 generally contacts the upper layer 22 during the welding process. The contact region 44 may be positioned in or near the center of the foot 28 and may have a generally rounded, hemispheric, or domed shape in order to maintain contact with the upper layer 22 while the foot 28 is rotating or if the tilt angle of the laser welding pressure unit 10 changes during the welding process. The lower surface 40 in the contact region 44 generally touches the upper layer 22 of the sheets 14.

The aperture 46 generally provides access of the laser beam 18 to the upper layer 22 in order to perform welding. The aperture 46 may be positioned in the center of the contact region 44 and generally presents an opening in the foot 28 from the upper surface 38 to the lower surface 40. Accordingly, the aperture 46 may include an upper opening 48 and a lower opening 50. The aperture 46 may have a frustoconical shape such that the upper opening 48 is larger than the lower opening 50 and the aperture 46 tapers linearly therebetween. The size of the lower opening 50 may be determined by the size or the diameter of the laser beam 18, which in turn may be related to the size or thickness of the weld 26 line. Generally, a larger laser beam 18 requires a larger opening in the lower surface 40.

In various embodiments, the laser head 16 may be offset or angled with respect to the central vertical axis 36 of the foot 28 to prevent the laser beam 18 from reflecting off of the upper layer 22 of the stack 20 and into the laser head 16, where the reflected laser beam 18 may cause damage to the laser source or the laser optics. In addition, the tilt of the laser head 16 may allow gases or fumes that are produced as a result of the welding to escape from the surface of the upper layer 22. The size of the upper opening 48 may be related to the angle at which the laser head 16 is offset from the central vertical axis 36 of the foot 28. The size of the upper opening 48 may also be related to the size of the laser beam 18. Generally, a larger offset angle of the laser head 16 may require a greater diameter upper opening 48, and likewise a larger diameter laser beam 18 may require a larger upper opening 48.

The rotating element 30 generally allows the foot 28 to rotate with respect to the retaining element 32 and, in turn, the housing 34 and the laser head 16. The rotating element 30 may include an inner rotating ring 52 and an outer rotating ring 54. The inner rotating ring 52 is generally circular or annular in shape and may rigidly connect to the coupling element 42 of the foot 28. The outer rotating ring 54 is generally circular or annular in shape and may rigidly connect to the retaining element 32. The outer rotating ring 54 may be slightly larger than the inner rotating ring such that the inner diameter of the outer rotating ring 54 is larger than the outer diameter of the inner rotating ring 52. The inner rotating ring 52 may be rotatably coupled to the outer rotating ring 54, such that the two rings 52, 54 may rotate independently with respect to one another. In various embodiments, there may be a plurality of bearings positioned directly between the inner rotating ring 52 and the outer rotating ring 54 that facilitate rotation of the rings 52, 54. In other embodiments, there may be one or more bushings or other low-friction components that allow the inner rotating ring 52 to easily rotate with respect to the outer rotating ring 54 and vice versa.

In certain embodiments, the inner rotating ring 52 may be a part of or may be integrally formed with the foot 28. Specifically, the inner rotating ring 52 may be joined with the coupling element 42 to form a single component. Thus, the foot 28 may be rotatably coupled to the outer rotating ring 54. In other embodiments, the outer rotating ring 54 may be a part of or may be integrally formed with the retaining element 32. Hence, the retaining element 32 may be rotatably coupled to the inner rotating ring 52. In still other embodiments, the inner rotating ring 52 may be integrally formed with the foot 28 and the outer rotating ring 54 may be integrally formed with the retaining element 32. Therefore, the laser welding pressure unit 10 may be include the housing 34, the retaining element 32, and the foot 28. In such embodiments, the foot 28 may rotate with direct respect to the retaining element 32.

The retaining element 32 generally retains or holds the rotating element 30 and, by extension the foot 28, in the housing 34. The retaining element 32 may be roughly annular in shape with a circular inner wall 56 and an outer wall that may be rectangular, square, or octagonal in shape. The inner wall 56 may be coupled with the outer rotating ring 54 of the rotating element 30. The outer wall 58 may couple with the housing 34 and the shape of the outer wall 58 may vary or be varied to adjust to variations in the housing 34.

The housing 34 generally couples the retaining element 32, and in turn the foot 28, to the laser head 16. Accordingly, the housing 34 may include a head adapter 60 and a foot adapter 62.

The head adapter 60 may be located in the upper half of the housing 34. The head adapter 60 may be appropriately shaped and sized to couple with the laser head 16, including its various components such as optics holders and the like. For example, if the laser head 16 is cylindrical shaped, then the head adapter 60 may include a cylindrical inner wall that is sized to fit the diameter of the laser head 16. Furthermore, the head adapter 60 may include connection features that can appropriately couple the housing 34 to the laser head 16. For example, the head adapter 60 may include internal threads such that the housing 34 can be screwed onto the laser head 16. Or, the head adapter 60 may include coupling features such as a bayonet attachment, or the like. Additionally, the head adapter 60 may include a flanged portion that couples to a similar shaped portion of the laser head 16.

In the lower half of the housing 34, there may be an open framework 64 or other similar structure to allow for ventilation of gases or fumes created during the welding process. Coupled to the bottom of the framework 64 may be the foot adapter 62, which may include at least two elongated rails 66. The rails 66 may be positioned on opposing sides of the framework 64 and in turn may couple to two opposing sides of the retaining element 32. In various embodiments, the foot adapter 62 may connect to the retaining element 32 with one or more screws on each rail 66. Although, in general, the foot adapter 62 may couple to the retaining element 32 in many conventional manners.

Furthermore, the rails 66 of the foot adapter 62 may be angled, tilted, or offset with respect to the framework 64 and the rest of the housing 34, such that the housing 34 couples to the retaining element 32 at an angle ranging from approximately 30.degree. to approximately 80.degree. Thus, given the angled structure of the housing 34, a central axis 68 of the laser head 16 may be offset or angled with respect to the central vertical axis 36 of the foot 28 at an angle ranging from approximately 5.degree. to approximately 60.degree., as seen in FIG. 5.

In most embodiments, the rotating element 30, the retaining element 32, and the housing 34 may be manufactured from materials that possess high strength and rigidity, such as hardened steel and the like.

Figure 6:
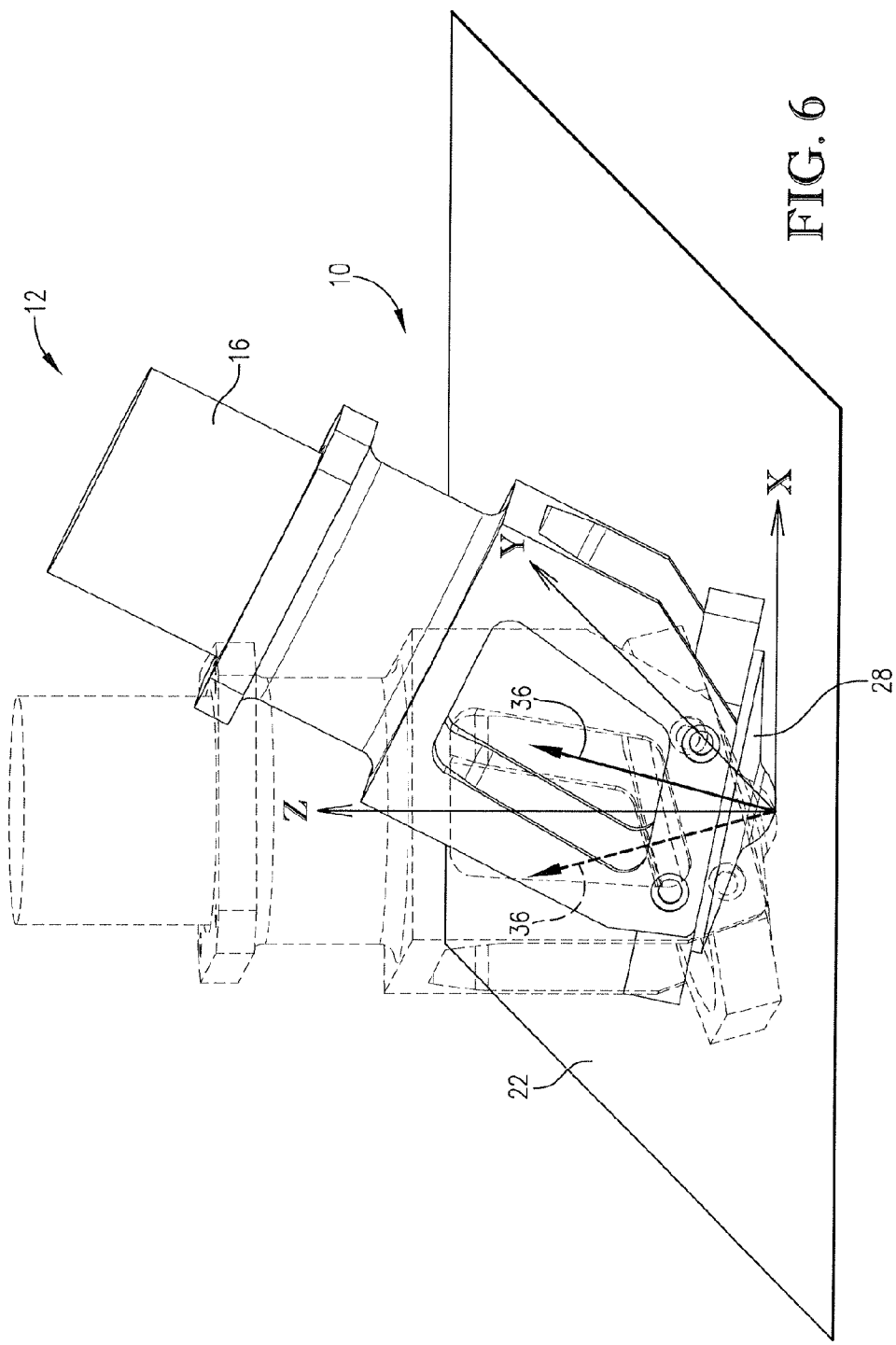
FIG. 6 is a perspective view of a sheet of metal depicting the tiling of the laser welding pressure unit with respect to an XYZ coordinate system.

The laser welding pressure unit 10 may operate as follows. In order for the foot 28 to rotate during welding, the foot 28 may be slightly tilted in a direction that is generally transverse to the direction of travel of the laser head 16, which is the same direction as the weld 26 path. For example, in a three-dimensional coordinate system, such as the X-Y-Z coordinate system shown in FIG. 6, the direction of travel along the weld 26 path may be considered to be along the Y-axis, while the X-axis may be perpendicular to the weld 26 path within the plane of the sheet 14 and the Z-axis may be perpendicular to the plane of the sheet 14. In a rest state, the central vertical axis 36 of the foot 28 may be positioned along the Z-axis. However, in order for the foot 28 to rotate while the laser head 16 moves, the foot 28 may be tilted such that the central vertical axis 36 of the foot 28 is positioned a few degrees away from the Z-axis in the general direction of the X-axis. The central vertical axis 36 may be tilted in either the positive X-axis direction or the negative X-axis direction. The tilting of the foot 28 may range from approximately 1.degree. to approximately 10.degree. Larger angles of tilt are possible, but not necessary. The entire laser welding pressure unit 10 may be tilted, typically by the laser welding system 12, in this fashion in order to appropriately tilt the foot 28. Furthermore, the tilting of the foot 28, as described, may be applied in any direction of travel of the laser head 16. For the tilting to work, the positive Y-axis always points in the direction of travel of the laser head 16, which also determines the path of the weld 26. And the X-axis, which is the direction of tilt, is always perpendicular to the weld 26 line.

Once tilted, the foot 28 may rotate about the central vertical axis 36 as the laser head 16 moves in the direction of the Y-axis. The direction of rotation of the foot 28 depends on the direction of travel and the direction of the tilt. The foot 28 may rotate clockwise (when viewed from the positive Z-axis) if the laser head 16 is moving in the positive Y-axis direction and the foot 28 is tilted in the positive X-axis direction. The foot 28 may rotate counterclockwise (when viewed from the positive Z-axis) if the laser head 16 is moving in the positive Y-axis direction and the foot 28 is tilted in the negative X-axis direction. The directions of rotation may be reversed if the laser head 16 is moving in the negative Y-axis direction. The laser welding system 12 may include a guidance control system (not shown in the figures) to control the motion of the laser head 16, which in turn determines the path and direction of the weld line 26. Furthermore, the laser welding system 12 may be responsible for tilting the foot 28 as described above.

The welding process may proceed as follows. Sheets 14 to be welded together may be placed on a support structure and may be arranged one on top of another. The laser welding system 12 may be positioned such that the foot 28, particularly the contact region 44, of the laser welding pressure unit 10 touches the upper layer 22 of the sheets 14 and applies a pressure. The laser welding system 12 may tilt the foot 28, activate the laser beam 18, and move the laser head 16 in the direction of the desired weld 26 path. The foot 28 may rotate as discussed above. When the laser head 16 changes direction, such as to follow a serpentine weld 26 path seen in FIG. 1, the laser welding system 12 may simply move the laser head 16 in the desired direction while the foot 28 continues to rotate. It is not generally necessary to stop the motion of the laser head 16 or adjust the tilt of the foot 28 in order to change the direction of travel. The welding process may continue in this fashion until the weld 26 path is complete and the laser beam 18 is deactivated.

In some instances, it may be desired to adjust the tilt of the foot 28 during the welding process. In such cases, the tilt of the foot 28 may be adjusted within the range of tilt from the Z-axis, as discussed above, while the laser head 16 is moving.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A laser welding pressure unit for welding an object comprising:
   a housing attachable to a laser head; and
   a foot coupled to the housing, the foot configured to contact an upper surface of the object and oriented such that while the object is being welded, the foot rotates about a substantially central, generally vertical axis and the laser welding pressure unit is operable to move in nearly any direction without the foot breaking contact with the upper surface.

2. The laser welding pressure unit of claim 1, wherein the central vertical axis is tilted from approximately one degree to approximately ten degrees away from being perpendicular to the object while the laser welding pressure unit is in motion.

3. The laser welding pressure unit of claim 1, wherein the foot is disc shaped with a rounded, substantially centrally-located contact area that protrudes downward and applies pressure to the metal sheet.

4. The laser welding pressure unit of claim 1, wherein the foot further includes a substantially centrally-located, frusto-conical aperture through which a laser beam supplied by the laser head passes.

5. The laser welding pressure unit of claim 1, further including a rotating element that includes an outer ring rotatably coupled to an inner ring which is attached to the foot and allows rotation of the foot with respect to the housing.

6. The laser welding pressure unit of claim 5, further including a retaining element coupled to the outer ring in order to retain the rotating element in the housing.

7. The laser welding pressure unit of claim 1, wherein the housing further includes a tilted foot adapter coupled to the foot such that a central axis of the laser head is positioned with respect to the central vertical axis of the foot at an angle ranging from approximately five degrees to approximately sixty degrees.

8. A laser welding pressure unit for welding an object comprising:
   a housing attachable to a laser head;
   a rotating element including an outer ring rotatably coupled to an inner ring, wherein the outer ring is coupled to the housing; and
   a foot coupled to the inner ring such that the foot rotates with respect to the housing, the foot configured to contact an upper surface of the object and oriented such that while the object is being welded, the foot rotates about a substantially central, generally vertical axis and the laser welding pressure unit is able to move in nearly any direction without the foot breaking contact with the upper surface.

9. The laser welding pressure unit of claim 8, wherein the central vertical axis is tilted from approximately one degree to approximately ten degrees away from being perpendicular to the object while the laser welding pressure unit is in motion.

10. The laser welding pressure unit of claim 8, wherein the foot further includes a substantially centrally-located, frusto-conical aperture through which a laser beam supplied by the laser head passes.

11. The laser welding pressure unit of claim 8, further including a retaining element coupled to the outer ring in order to retain the rotating element in the housing.

12. The laser welding pressure unit of claim 8, wherein the housing further includes a tilted foot adapter coupled to the foot such that a central axis of the laser head is positioned with respect to the central vertical axis of the foot at an angle ranging from approximately five degrees to approximately sixty degrees.

13. The laser welding pressure unit of claim 8, wherein the foot is disc shaped with a rounded, substantially centrally-located contact area that protrudes downward and applies pressure to the metal sheet.

14. A laser welding system comprising:
   a laser head configured to supply a laser beam to create a weld; and
   a laser welding pressure unit coupled to the laser head and configured to contact an upper surface of an object to be welded during welding such that the weld may be created in nearly any direction without the laser welding pressure unit breaking contact with the surface, the laser welding pressure unit including—a housing attachable to the laser head, and a foot coupled to the housing, the foot including a substantially central, generally vertical axis about which the foot rotates while the object is being welded.

15. The system of claim 14, wherein the central vertical axis is tilted from approximately one degree to approximately ten degrees away from being perpendicular to the object while the laser welding pressure unit is in motion.

16. The system of claim 14, wherein the foot further includes a substantially centrally-located, frusto-conical aperture through which the laser beam passes.

17. The system of claim 14, wherein the housing further includes a tilted foot adapter coupled to the foot such that a central axis of the laser head is positioned with respect to the central vertical axis of the foot at an angle ranging from approximately five degrees to approximately sixty degrees.

18. The system of claim 14, wherein the foot is disc shaped with a rounded, substantially centrally-located contact area that protrudes generally downward and applies pressure to the metal sheet.

19. The system of claim 14, wherein the laser welding pressure unit further includes a rotating element that includes an outer ring rotatably coupled to an inner ring which is attached to the foot and allows rotation of the foot with respect to the housing.

20. The system of claim 19, wherein the laser welding pressure unit further includes a retaining element coupled to the outer ring in order to retain the rotating element in the housing.

* * * * *